United States Patent
Desmither

(10) Patent No.: US 7,712,246 B2
(45) Date of Patent: May 11, 2010

(54) VERTICAL RODENT TRAP

(76) Inventor: Larry J. Desmither, P.O. Box 5642, Keaau, HI (US) 96749

( * ) Notice: Subject to any disclaimer, the term of this patent is extended or adjusted under 35 U.S.C. 154(b) by 27 days.

(21) Appl. No.: 11/907,134

(22) Filed: Oct. 9, 2007

(65) Prior Publication Data

US 2009/0090043 A1 Apr. 9, 2009

(51) Int. Cl.
  *A22C 21/02* (2006.01)
(52) U.S. Cl. ......................................... 43/81
(58) Field of Classification Search ............ 43/81, 43/81.5, 82, 83
  See application file for complete search history.

(56) References Cited

U.S. PATENT DOCUMENTS

| | | | | |
|---|---|---|---|---|
| 842,610 | A | * | 1/1907 | Armstrong .................... 43/82 |
| 1,119,962 | A | * | 12/1914 | Horr ............................ 43/81 |
| 1,347,310 | A | * | 7/1920 | Van Meter .................... 43/81 |
| 1,376,695 | A | * | 5/1921 | Hoare .......................... 43/81 |
| 1,434,505 | A | * | 11/1922 | Schmidt ....................... 43/88 |
| 1,753,814 | A | | 4/1930 | Weller |
| 1,992,353 | A | * | 2/1935 | Cattanach ..................... 43/81 |
| 2,170,000 | A | * | 8/1939 | Eggleston ..................... 43/17 |
| 2,311,178 | A | * | 2/1943 | Jorgensen .................. 43/81.5 |
| 2,340,256 | A | * | 1/1944 | Weil ............................ 43/131 |
| 2,408,593 | A | | 10/1946 | Barber |
| 3,204,365 | A | * | 9/1965 | Sartin ........................... 43/81 |
| 4,357,776 | A | * | 11/1982 | Knaak .......................... 43/96 |
| 4,366,642 | A | | 1/1983 | Gardner et al. |
| 4,411,091 | A | | 10/1983 | Hedstrom et al. |
| 4,477,997 | A | * | 10/1984 | Bumgarner .................... 43/58 |
| 4,574,519 | A | | 3/1986 | Eckebrecht |
| 4,578,893 | A | | 4/1986 | Wickenberg |
| 4,780,984 | A | | 11/1988 | Courty |
| 5,706,601 | A | * | 1/1998 | Dail ............................. 43/81 |
| 5,930,943 | A | | 8/1999 | Olson |
| 5,960,583 | A | | 10/1999 | Hansson |
| 6,574,912 | B1 | | 6/2003 | Johnson |

FOREIGN PATENT DOCUMENTS

WO    WO 86/05948    10/1986

* cited by examiner

*Primary Examiner*—Thomas Price
(74) *Attorney, Agent, or Firm*—Richard C. Litman

(57) ABSTRACT

The vertical rodent trap provides a rodent trap that is oriented in a substantially vertical direction and spaced apart from a support surface, thus requiring a rodent to achieve a substantially vertical position in order to attempt to remove bait therefrom. This vertical position of the rodent is optimal for capture and killing thereof. The vertical rodent trap includes a conventional rodent trap that is vertically spaced apart from a horizontal support surface, such as the ground. A base, adapted for being horizontally mounted on the horizontal support surface, is further provided, and the lower end of a rod is secured to the base. The rod projects upwardly from the base and supports the conventional rodent trap, both spacing the rodent trap from the base and vertically orienting the rodent trap. Preferably, steel wool is secured to a bait-receiving member of the rodent trap for retaining bait thereto.

4 Claims, 2 Drawing Sheets

US 7,712,246 B2

VERTICAL RODENT TRAP

BACKGROUND OF THE INVENTION

1. Field of the Invention

The present invention relates to animal traps, and particularly to a vertical rodent trap that is oriented in a substantially vertical direction.

2. Description of the Related Art

Rodents, such as mice and rats, are typically considered to be pests by homeowners, shopkeepers, and the like because they tend to devour food stores, spread disease, soil dwellings, storage and production facilities, and degrade fixtures and structures through gnawing, scratching, and nesting. Some rodent infestations may be dealt with through the distribution of poisoned bait. In other situations where it is desirable to avoid the use of rodenticide, or where the retention of the targeted rodent is necessary, mechanical rodent traps may be employed.

Mouse, rat, and other types of mechanical, small animal traps are well known in the art. Such traps may, for example, include a stand in the form of a plate, at which a clamp may be stretched against the force of a spiral spring, arranged around its turning axis to a loaded position, in which a lock pin keeps the clamp at the plate. The free end of the lock pin is then inserted in the loop of a locking means in the form of a movable plate, at which the bait is fixed (e.g., in the form of a piece of cheese). Such traps, though, are arranged horizontally, allowing the rodent to access the bait while crawling on all four of its legs. In this position, and with the use of all of its limbs, the rodent can easily snatch the bait from the trap without being captured or killed thereby.

Further, such conventional traps typically do not include means for retaining the bait on the trap, other than through the force of gravity. Thus, the bait can be easily dislodged. Further, with the rodent in a generally horizontal position, the trap may be sprung on any part of the rodent's body, without control thereover, which does not assure secure capture, or killing, of the rodent. Thus, a vertical rodent trap solving the aforementioned problems is desired.

SUMMARY OF THE INVENTION

The vertical rodent trap provides a rodent trap that is oriented in a substantially vertical direction and spaced apart from a support surface, thus requiring a rodent to achieve a substantially vertical position in order to attempt to remove bait therefrom. This vertical position of the rodent is optimal for capture and killing thereof.

The vertical rodent trap includes a vertically-oriented board having opposed front and rear surfaces, with a substantially U-shaped bar being pivotally joined to the front surface thereof. A trip bar having opposed upper and lower ends is further provided, with the upper end thereof being pivotally joined to an upper end of the front surface of the vertically-oriented board.

A bait-receiving member, adapted for receiving the aromatic rodent bait, is pivotally joined to the front surface of the vertically-oriented board, and releasably engages the lower end of the trip bar. At least one spring is provided so that the substantially U-shaped bar is spring-biased against the trip bar when the lower end of the trip bar engages the bait-receiving member in order to hold the vertical rodent trap in a set position. Pivoting of the bait-receiving member by a rodent with respect to the vertically-oriented board disengages the trip bar from the bait-receiving member in order to trap the rodent between the substantially U-shaped bar and the front surface of the vertically-oriented board. The force of the U-shaped bar striking the rodent, under the force of the spring, will kill the rodent for disposal thereof.

A base adapted for mounting on a substantially horizontal support surface is further provided, along with a rod having opposed upper and lower ends. The lower end of the rod is secured to the base and projects substantially upwardly therefrom. The upper end of the rod is secured to, and supports the vertically-oriented board, thus spacing the vertically-oriented board apart from the base. Preferably, the upper end of the rod is secured to the rear surface of the vertically-oriented board. This positioning requires the rodent to achieve the aforementioned vertical position in order to try to remove the aromatic bait from the bait-receiving member. This vertical position of the rodent assures proper capture and killing of the rodent when the trap is tripped.

In the preferred embodiment, a fibrous material, such as steel wool, is secured to the bait-receiving member to cover and receive the bait, thus making the aromatic bait more difficult to remove from the bait-receiving member.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
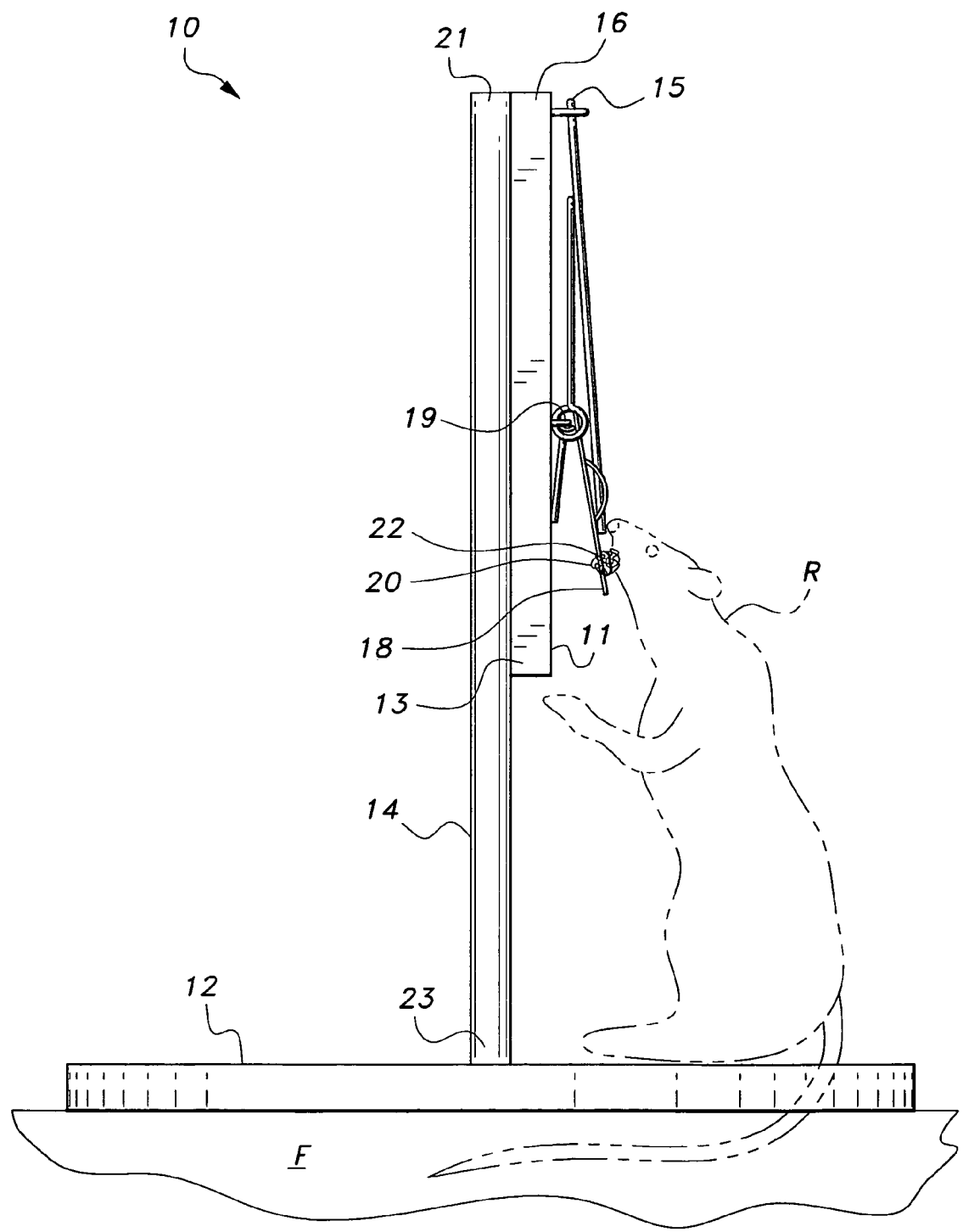
FIG. 1 is an environmental side view of a vertical rodent trap according to the present invention.

The present invention is directed towards a vertical rodent trap 10. As shown in FIG. 1, the vertical rodent trap 10 provides a rodent trap that is oriented in a substantially vertical direction and spaced apart from a support surface (such as floor F), thus requiring a rodent, such as exemplary rat R, to achieve a substantially vertical position (as shown in FIG. 1) in order to attempt to remove bait 22 therefrom. This vertical position of the rodent is optimal for capture and killing of rat R. As shown in FIG. 1, rat R is forced to stand on its rear legs in order to try to eat the bait. Thus, when the trap is tripped, the bar 28 (to be described in detail below) will come down on the rat's back or neck, instantly killing the rat R.

Figure 2:
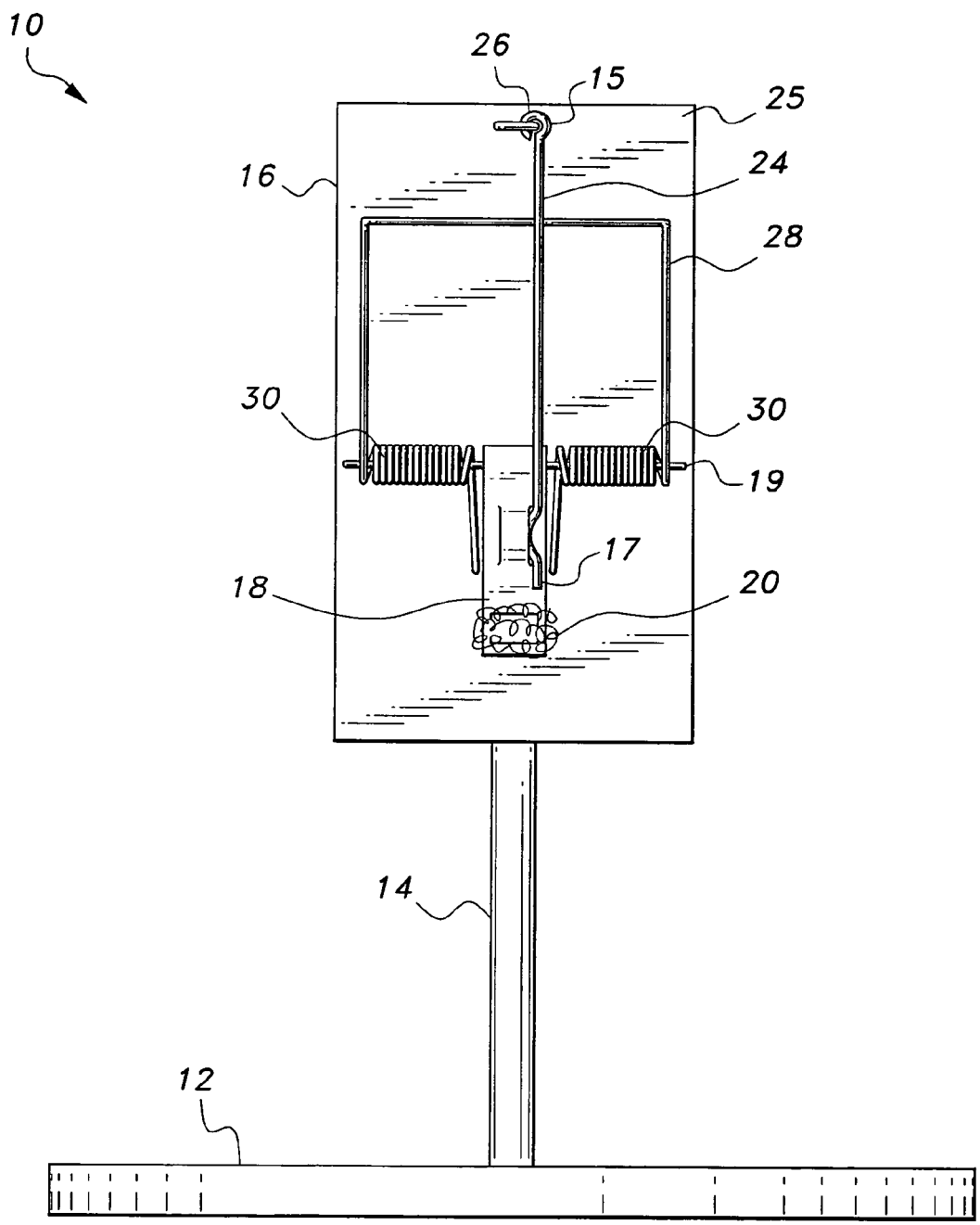
FIG. 2 is a front elevation view of the vertical rodent trap according to the present invention.

Any conventional rodent trap or rodent capturing device may be used, with the rodent trap being supported on rod 14 and spaced apart from base 12 (as will be described in greater detail below). However, as shown in FIGS. 1 and 2, in the preferred embodiment, the vertical rodent trap 10 includes a vertically-oriented board 16 having opposed front and rear surfaces, 11, 13, respectively, with a substantially U-shaped bar 28 being pivotally joined to the front surface 11 thereof, about rod 19. A trip bar 26 having opposed upper and lower ends 15, 17, respectively, is further provided, with the upper end 15 thereof being pivotally joined to an upper end 25 of the front surface 11 of the vertically-oriented board 16, as shown.

A bait-receiving member 18, adapted for receiving the aromatic rodent bait 22, which may be peanut butter, cheese or the like, is pivotally joined, about rod 19, to the front surface 11 of the vertically-oriented board 16, and releasably engages the lower end 17 of the trip bar 26. At least one spring is provided so that the substantially U-shaped bar 28 is spring-biased against the trip bar 24 when the lower end of the trip bar 24 engages the bait-receiving member 18 in order to hold the vertical rodent trap 10 in the set or un-tripped position shown in the Figures. The pair of helical torsion springs 30 are shown for exemplary purposes only, and any suitable spring element or resilient element may be used.

Pivoting of the bait-receiving member 18 by rodent R with respect to the vertically-oriented board 16 disengages the trip bar 24 from the bait-receiving member 18 in order to trap the rodent R between the substantially U-shaped bar 28 and the front surface of the vertically-oriented board 16. The force of the U-shaped bar 28 striking the rodent R, under the force of the springs 30, causing pivoting of the bar 28, will kill and capture the rodent R for disposal thereof.

A base 12 adapted for mounting on a substantially horizontal support surface, such as floor F, is further provided, along with a rod 14 having opposed upper and lower ends 21, 23, respectively. The base 12 may have any suitable size or shape, e.g., the base 12 may be substantially circular. The lower end 23 of the rod 14 is secured to the base 12 and projects substantially upwardly therefrom. The upper end 21 of the rod 14 is secured to and supports the vertically-oriented board 16, thus spacing the vertically-oriented board 16 apart from the base 12. Preferably, the upper end 21 of the rod 14 is secured to the rear surface 13 of the vertically-oriented board 16, as shown in FIG. 1. However it should be understood that rod 14 may be joined to any suitable region of board 16. This positioning requires the rodent R to achieve the aforementioned vertical position (shown in FIG. 1) in order to try to remove the aromatic bait 22 from the bait-receiving member 18. This vertical position of the rodent R assures proper capture and killing of the rodent R when the trap 10 is tripped.

Traps 10 may be manufactured in various sizes suited to the application. For example, a trap 10 designed to capture a typical mouse may have a rod 14 which separates bait 22 from base 12 by a distance of approximately three inches, which allows for optimal striking of the mouse by bar 28 when the mouse is in the position shown in FIG. 1. However, if the user wishes to capture and kill a rat, which is typically larger than a mouse, then the user may utilize a trap 10 having a rod 14 that separates bait 22 from base 12 by a distance of approximately six inches. The other elements of trap 10, such as board 16, may similarly be varied in dimension and configuration. Base 12 and rod 14 may be formed from wood, metal or any other suitable materials.

In the preferred embodiment, a fibrous material, such as steel wool 20, is secured to the bait-receiving member 18 to cover and receive the bait 22, thus making the aromatic bait 22 more difficult to remove from the bait-receiving member 18. It should be understood that any fibrous material, such as a wad of plastic fibers or a mesh material, may be used instead of the steel wool 20, if desired. The steel wool 20 is removable, thus allowing for replacement or cleaning thereof. It should be understood that steel wool 20 is wrapped around, or otherwise secured to, bait holder 18 such that, in operation, when steel wool 20 is moved (through tugging by rat R, for example), the trap will be sprung. It should be understood that in addition to steel wool, nylon, plastic fiber or any other suitable material may be utilized.

It is to be understood that the present invention is not limited to the embodiments described above, but encompasses any and all embodiments within the scope of the following claims.

I claim:

1. A vertical rodent trap, comprising:
    a rodent trap including a bait-receiving member, the vertical rodent trap further comprising means for securing aromatic rodent bait to the bait-receiving member;
    a base having a substantially planar bottom surface adapted for mounting on a substantially horizontal support surface, said means for attracting the rodent being fixed so as to be vertically spaced above said base; and
    a rod having opposed upper and lower ends, the lower end of the rod being secured to the base and projecting substantially upwardly therefrom, the rodent trap being fixedly attached to the upper end of the rod, thereby maintaining its vertical position relative to the base.

2. The vertical rodent trap as recited in claim 1, wherein said means for securing the aromatic rodent bait to the bait-receiving member comprises a fibrous material secured to said bait-receiving member.

3. The vertical rodent trap as recited in claim 2, wherein said fibrous material comprises steel wool.

4. The vertical rodent trap as recited in claim 1, wherein the upper end of said rod is secured to a rear surface of said rodent trap.

* * * * *